UNITED STATES PATENT OFFICE.

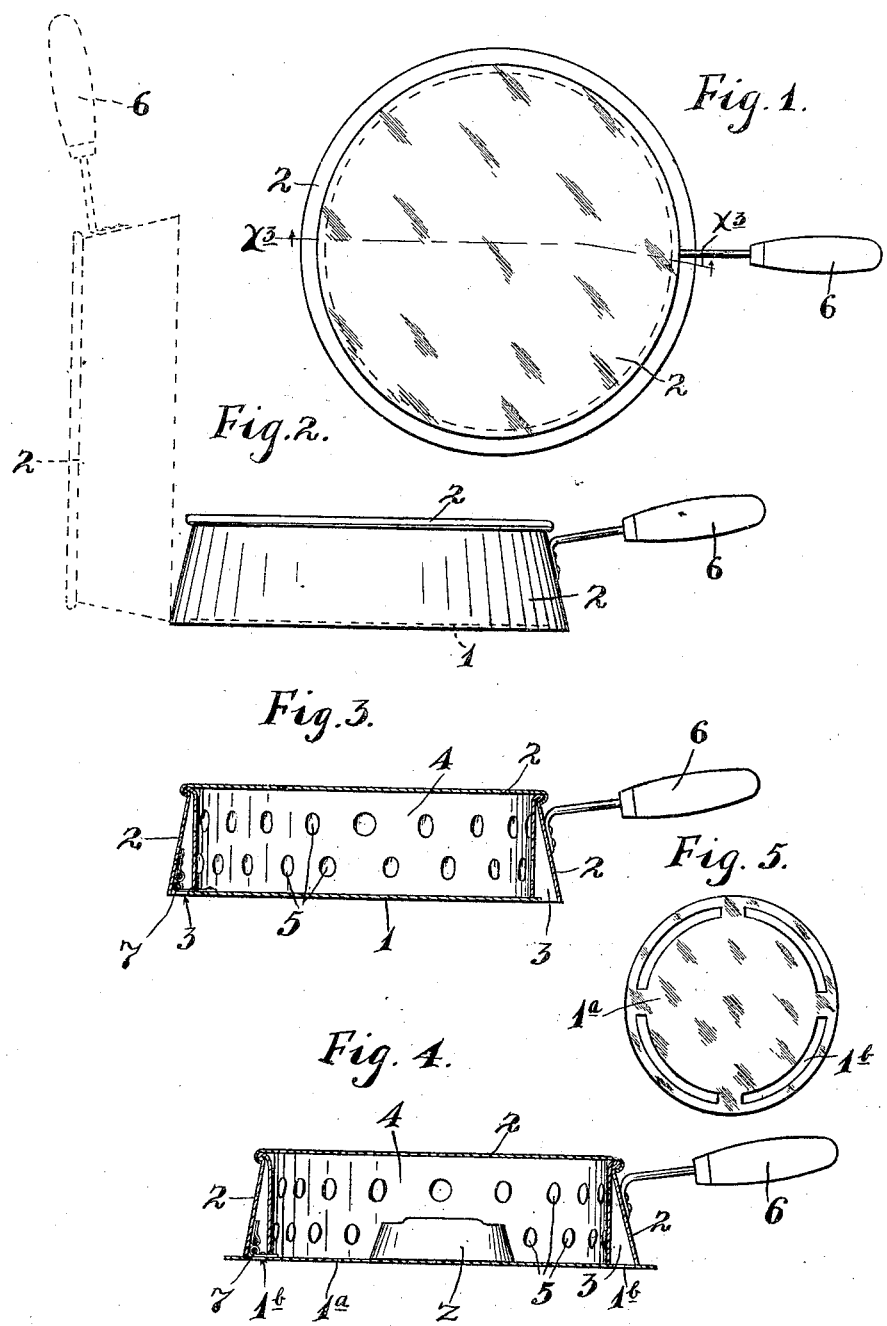

JOHN HAGEN, OF HOPKINS, MINNESOTA.

FLAT-IRON HEATER.

No. 914,267.  Specification of Letters Patent.  Patented March 2, 1909.

Application filed September 30, 1908. Serial No. 455,573.

*To all whom it may concern:*

Be it known that I, JOHN HAGEN, a citizen of the United States, residing at Hopkins, in the county of Hennepin and State of Minnesota, have invented certain new and useful Improvements in Flat-Iron Heaters; and I do hereby declare the following to be a full, clear, and exact description of the invention, such as will enable others skilled in the art to which it appertains to make and use the same.

My invention has for its object to provide an improved flat iron heater, and to this end, it consists of the novel devices and combinations of devices hereinafter described and defined in the claim.

In the accompanying drawings, which illustrate the invention, like characters indicate like parts throughout the several views.

Referring to the drawings: Figure 1 is a plan view showing the improved heater in its preferred form. Fig. 2 is a side elevation of the same, with the movable part thereof shown in open position by dotted lines. Fig. 3 is a transverse vertical section, taken on the line $x^3$ $x^3$ of Fig. 1. Fig. 4 is a view corresponding to Fig. 3, but illustrating a slightly modified construction; and Fig. 5 is a plan view showing on a smaller scale than in Fig. 4 the bottom plate of the heater shown in said Fig. 4.

Referring first to the construction illustrated in Figs. 1 to 3, inclusive, the numeral 1 indicates a flat thin sheet metal bottom plate of disk-like form. The numeral 2 indicates an inverted heating pan having downwardly flaring sides which, at the lower edge or open bottom of the pan, have greater diameter than the diameter of the disk-like bottom 1, so that when concentrically located over and around the same, an annular flame passage 3 will be formed, as best shown in Fig. 3. The pan 2 has a depending cylindrical flange 4 that is formed with a multiplicity of perforations 5. This flange 4 is preferably of less diameter than the bottom 1 and rests directly on top of the same when the heater is closed. At one side, the pan 2 is provided with a handle 6, and at its opposite side it is connected by a hinge 7 to the adjacent edge of the disk-like bottom 1. The hinge 7 is located so close to the lower edge of the flaring and depending side of the pan, that the said pan may be turned upward into the position shown by dotted lines in Fig. 2 without raising the bottom 1 from the stove. One or more flat irons, when the handles are removed, are capable of being placed on top of the bottom plate 1, and will be inclosed within the pan 2 when the latter is turned downward into its closed position, indicated by full lines in Figs. 1, 2 and 3. The bottom plate 1 is adapted to be placed over the burner of a gas stove, or it may be placed over a griddle hole of a cooking stove or directly on top of such stove. The heat from the burner or from the stove will, of course, be conducted rapidly upward through the thin metallic bottom 1 to the irons; and, furthermore, the hot products of combustion of a gas burner will be deflected around the edge of the bottom 1 and will be passed upward through the annular space 3 and through the perforations 5 into the interior of the pan 2, and will thus directly act upon the irons. The irons will thus be very rapidly heated; and, furthermore, the heat confined within the pan will be kept in action on the irons, and will be prevented from rapid escape, so that a very great saving in fuel for the amount of heat required to keep the irons hot, is effected.

The construction illustrated in Figs. 4 and 5 is like that illustrated in Figs. 1, 2 and 3, except that the bottom plate 1ª is extended outward beyond the downturned outer flange of the pan 2 and is provided with segmental passages 1ᵇ which, like the annular space 3, permit the hot flames to pass upward into the pan.

A flat iron of a well known type having a detachable handle, not shown, is indicated by the character Z.

The perforated interior flange 4 of the pan 2 while it permits the heat to enter the pan for action on the flat irons, acts as a baffle or deflector to prevent smoke or soot from coming into contact with the irons being heated.

The efficiency of this device has been demonstrated in practice.

The heater may be made of almost any kind of sheet metal, but is preferably made of copper.

What I claim is:—

A flat iron heater comprising a flat bottom plate, an inverted pan hinged thereto and having an imperforate side and provided with a handle, a perforated flange located within said pan and spaced apart from the sides thereof to afford a flame passage, substantially as described.

In testimony whereof I affix my signature in presence of two witnesses.

JOHN HAGEN.

Witnesses:
H. D. KILGORE,
M. E. RONEY.